Figure 1:
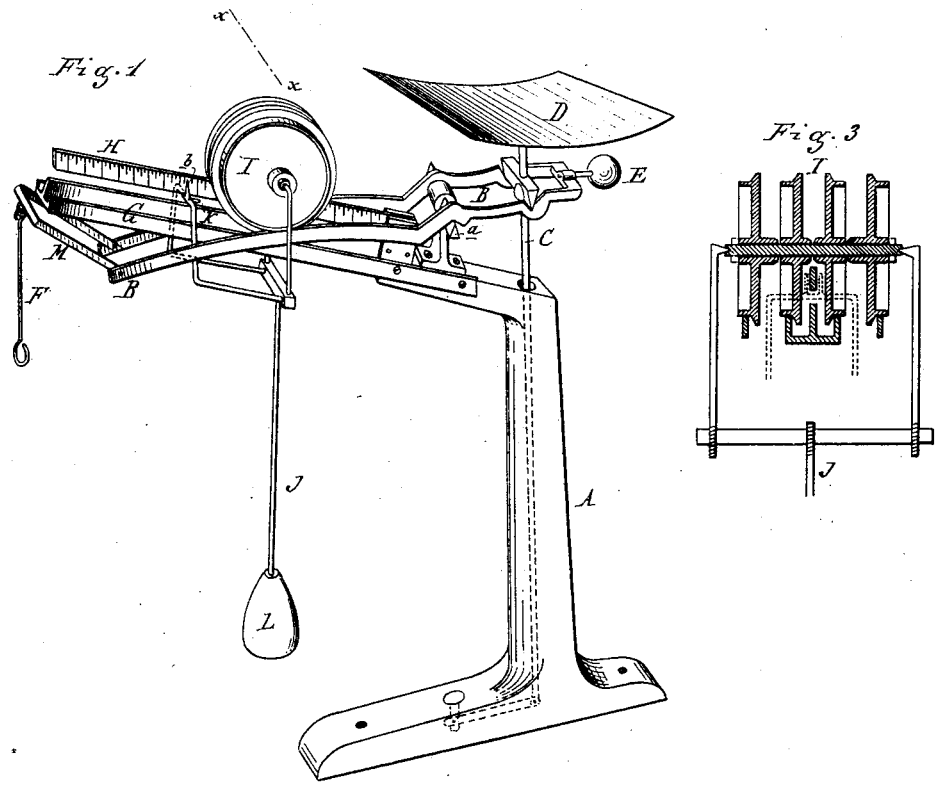

(Model.)

J. R. HAIGHT.
Automatic Indicating Weighing Scale.

No. 239,771. Patented April 5, 1881.

Attest:
A. Barthel
O. Wahl

Inventor:
Jas. R. Haight
By atty
Thos. S. Sprague

UNITED STATES PATENT OFFICE.

JAMES R. HAIGHT, OF ADRIAN, MICHIGAN.

AUTOMATIC INDICATING WEIGHING-SCALE.

SPECIFICATION forming part of Letters Patent No. 239,771, dated April 5, 1881.

Application filed October 8, 1880. (Model.)

*To all whom it may concern:*

Be it known that I, JAMES R. HAIGHT, of Adrian, Lenawee county, Michigan, have invented an Improvement in Scales, of which the following is a specification.

The nature of this invention relates to certain new and useful improvements in the construction of scales wherein are combined the features of beam and indicating scales.

Heretofore in beam weighing-scales the beam-weight used to counterbalance the weight of any body upon the scale pan or platform has been pushed or lifted along the beam to obtain the balancing-point, requiring considerable time and close attention to obtain the exact weight or balance; and in self-adjusting or indicating scales, such as pendulum weighing-scales, considerable time is required to obtain the equilibrium or point of balance unless the vibrations are stopped by the operator. Spring-scales require less time, but are not so reliable.

The object of my invention is to provide scales that shall be quick and positive in their action, obviating the objections in pendulum-vibrating and spring indicating scales.

My invention consists, first, in the combination, with a balanced beam one arm of which has its top surface curved longitudinally, of a stationary inclined plane of any desired angle, having its face toward the fulcrum-point and its vertical sides adjacent and parallel to the plane in which the curved arm moves within the prescribed angle of vibration; second, the combination, with a curved beam which vibrates adjacent and parallel to an inclined plane, of a rolling or cylindrical weight placed upon said curved beam and inclined plane, and having a shaft upon which parts of such rolling weights turn freely, and whose diameters are equal, causing the weight to roll upon such curved beam and inclined plane at the same time and in a straight course; third, in a beam-scale having the combination, with curved beam and an inclined plane so placed in relation to each other that a rolling weight is sustained by both and caused to roll upon both whenever the beam moves, of an attachment to the rolling weight, whereby a pendulum hangs from its center of gravity, remaining vertical when the weight is at rest, but swings or vibrates when such rolling weight changes position; fourth, the combination of a rolling weight having a pendulum attachment with a brake for controlling the motion of the rolling weight, bringing it to the point of balance or equilibrium quickly without affecting the correctness of the same; fifth, in beam-scales having the combination of an inclined plane of any desired angle and a beam having its top surface curved longitudinally and in such a manner that whenever a rolling weight rests upon any point or points parallel in such curved surface, and upon the surface of the inclined plane at the same time, being also in equilibrium with weight or power applied to the opposite arm of the scale-beam, the pressure of the rolling weight shall be in proportion to the weight or power applied to a point on the opposite arm of the beam as the horizontal distance from the fulcrum-point to a vertical line drawn through the center of gravity of such applied weight is to the distance from the fulcrum-point to a vertical line drawn through the point of contact of the rolling weight upon the curved beam.

Figure 3:
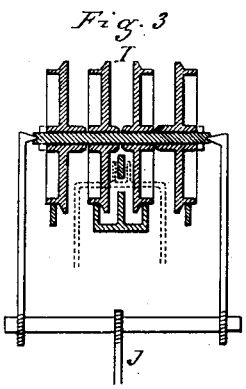
Figure 2:
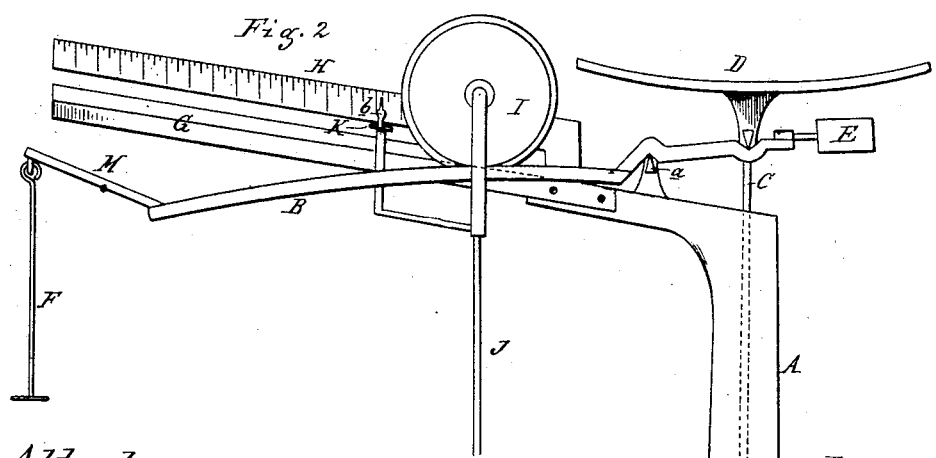

In the drawings, Figure 1 is a perspective view of my improved device. Fig. 2 is a side elevation, and Fig. 3 is a vertical cross-section on the line *x x* in Fig. 1.

In the accompanying drawings, which form a part of this specification, A represents the post or standard which supports the operating parts of the device.

B represents the balance-beam, fulcrumed at *a* upon the standard in any desired manner, and to the short arm of which is properly adjusted the vertical rod C, carrying a pan or platform, D, and adjusting-weight E. The longer arm of this beam is curved downward, as shown, and carries upon its outer end the extension M, from which is suspended the vertically-hanging weight-rod F.

G is an inclined beam, rigidly secured at one end to the standard, having its face toward the fulcrum-point of the balance-beam and its vertical sides parallel to the plane in which such beam vibrates. Above this beam G is secured an indicator-beam, H.

I is a rolling weight, consisting of two or more suitable disks journaled upon a common shaft, the diameters of such weights or disks being equal. The outer pair of these weights rests and travels upon the upper edge of the vibrating beam B, while the inner pair rests upon and travels upon the edges of the stationary beam G.

J represents a pendulum properly hung upon the shaft which carries the weight I, and to this pendulum is secured a brake, K, which, in turn, is provided with an index-finger, b, upon either side of the beam H, and to the lower end of the pendulum is secured a suitable weight, L.

In practice, with an inclined beam of six inches in length and of an angle of fifteen degrees from a horizontal line, I prefer to use a curved beam of a radius of about twelve inches, with its outer end about two inches in a vertical line from the inclined beam; but I do not confine myself to this exact construction, as beams of a different radius and in different positions can be used. In laying out the scale-marks on the inclined beam a weight is placed on the pan, and the place indicated by the pointer is the proper place to mark the weight. Different weights give the different graduations. After one scale has been properly graduated all others of the same capacity can have their curved beams of the same curve and their inclined beams with the same graduations.

In practice, the parts being constructed and arranged substantially as herein set forth and adjusted so that the parts are equally balanced when at rest, if it is desired to weigh a quantity of material within the range or scope of the beam H—say six ounces for example—the material is placed upon the platform. This causes a depression of the short arm of the vibrating beam B and compels the roller-weights to run out upon the same and on the beam G, a sufficient quantity being put on or removed from the platform until the index-finger points to the graduate-mark 6 on the scale. This movement of the parts causes a vibration of the pendulum and its attachments, bringing the brake in contact with the face of the beam H, checking the momentum of the rolling weights, and causing them to assume the desired position almost instantly.

When material is imposed upon the platform that is heavier than the scope of the graduated scale or beam, proper weights may be placed upon the weight-rod F in the usual manner, while the extension M prevents the rolling weights running off when such excess of weight is applied.

I do not desire to confine myself to the exact construction of parts as described, as there are various ways in which the same result can be produced without departing from the spirit of my invention.

What I claim as my invention is—

1. A scale wherein is combined a curved oscillating beam adapted to actuate rolling weights to indicate upon a stationary indicator-beam the weight imposed, substantially as specified.

2. In beam-scales, the combination, with a curved beam separated into parallel parts, adapted to pass on either side, of an inclined plane whose vertical sides are parallel to the plane in which the curved beam moves, substantially as set forth.

3. In beam-scales, the combination, with a curved beam separated into parallel parts, adapted to pass on either side of an inclined plane whose vertical sides are parallel to the plane in which the curved beam moves, of a cylindrical or rolling weight adapted to rest and travel upon both the incline and curved beam, substantially as set forth.

4. In beam-scales, the combination of a curved beam and an incline, substantially as described, with a rolling weight and a pendulum attachment which will remain vertical in whatever position the rolling weight may assume, substantially as described.

5. In beam-scales constructed substantially as described, a pendulum attachment adapted to operate as a brake to control the motion of the rolling weight, substantially as specified.

JAMES R. HAIGHT.

Witnesses:
H. S. SPRAGUE,
A. WAHL.